(12) United States Patent
Ell

(10) Patent No.: US 9,643,736 B1
(45) Date of Patent: May 9, 2017

(54) SYSTEMS AND METHODS FOR LANDING LIGHTS

(71) Applicant: Goodrich Corporation, Charlotte, NC (US)

(72) Inventor: Todd Ell, Savage, MN (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/099,220

(22) Filed: Apr. 14, 2016

(51) Int. Cl.
*G01C 23/00* (2006.01)
*B64D 47/04* (2006.01)
*B64D 47/08* (2006.01)
*G06K 9/00* (2006.01)

(52) U.S. Cl.
CPC ............. *B64D 47/04* (2013.01); *B64D 47/08* (2013.01); *G06K 9/00785* (2013.01)

(58) Field of Classification Search
CPC ........ B64D 45/0015; B64D 2045/0045; G01C 23/00; G08G 5/0013; G08G 5/0021
See application file for complete search history.

(56) References Cited

U.S. PATENT DOCUMENTS

| | | | |
|---|---|---|---|
| 5,355,131 A | 10/1994 | Metz et al. | |
| 8,337,059 B2 | 12/2012 | Barnett et al. | |
| 8,738,236 B2 | 5/2014 | Moizard et al. | |
| 8,872,425 B2 | 10/2014 | Endo et al. | |
| 9,177,204 B1 * | 11/2015 | Tiana | G06K 9/0063 |
| 2008/0137353 A1 | 6/2008 | Larsen et al. | |
| 2011/0178658 A1 * | 7/2011 | Kotaba | G01C 21/005 |
| | | | 701/3 |
| 2013/0113935 A1 | 5/2013 | Naik et al. | |
| 2015/0146442 A1 | 5/2015 | Bonnefous et al. | |

* cited by examiner

*Primary Examiner* — Minh D A
(74) *Attorney, Agent, or Firm* — Snell & Wilmer L.L.P.

(57) ABSTRACT

A landing light system and steering method and computer readable medium is provided. A landing light system includes a camera, a controller, and a landing light. A tangible, non-transitory memory may have instructions for controlling a landing light. The controller may perform operations including receiving a first image at a first time from the camera, receiving a second image at a second time from the camera, estimating a focus of expansion between the first image and the second image, and aiming the landing light based on the focus of expansion.

20 Claims, 6 Drawing Sheets

SYSTEMS AND METHODS FOR LANDING LIGHTS

FIELD

The present disclosure relates to aircraft landing systems, and, more specifically, to aircraft landing light systems.

BACKGROUND

Commercial aircraft typically employ external landing lights used during take-off, landing, and taxiing for the purpose of illuminating an area around the aircraft for visibility for the pilot. It is advantageous to illuminate the runway during take-off, landing, and taxiing. Aircraft landing lights typically have an illumination path that is aimed in the direction according to the orientation of the nose of the aircraft. However, crosswinds can cause an aircraft to pitch and drift, resulting in the nose of the aircraft pointing in a direction different than the direction the aircraft is traveling. Landing lights aimed forward of the aircraft may point away from the runway landing strip. A poorly lit runway may increase the difficulty of landing an aircraft.

SUMMARY

Systems for landing light steering are disclosed herein. A landing light system may comprise a camera, a controller, a landing light, and a non-transitory memory configured to communicate with the controller. The tangible, non-transitory memory having instructions stored thereon that, in response to execution by the controller, cause the controller to perform operations. The operations may include receiving, by the controller, a first image at a first time from the camera. The operations may include receiving, by the controller, a second image at a second time from the camera. The operations may include estimating, by the controller, a focus of expansion between the first image and the second image. The operations may include aiming, by the controller, the landing light based on the focus of expansion.

The operations may further include identifying, by the controller, a feature in the first image and the second image, and registering, by the controller, a first position of the feature in the first image with a second position of the feature in the second image. The operations may further include determining, by the controller, an expansion vector of the feature. The operations may further include receiving, by the controller, a camera boresight position. The operations may further include extracting, by the controller, a bearing angle based on the focus of expansion and the camera boresight position. The operations may further include determining, by the controller, a motion of the camera, and correcting, by the controller, the focus of expansion based on the motion of the camera.

The landing light system may further comprise a sensor. The operations may further include receiving, by the controller, a data from the sensor, and verifying, by the controller, the focus of expansion based on the data from the sensor.

An article of manufacture may include a non-transitory, tangible computer readable storage medium having instructions stored thereon that, in response to execution by a controller, cause the controller to perform operations. The operations may include receiving, by the controller, a first image at a first time from the camera. The operations may include receiving, by the controller, a second image at a second time from the camera. The operations may include estimating, by the controller, a focus of expansion between the first image and the second image. The operations may include aiming, by the controller, the landing light based on the focus of expansion.

The operations may further include identifying, by the controller, a feature in the first image and the second image, and registering, by the controller, a first position of the feature in the first image with a second position of the feature in the second image. The operations may further include determining, by the controller, an expansion vector of the feature. The operations may further include receiving, by the controller, a camera boresight position. The operations may further include extracting, by the controller, a bearing angle based on the focus of expansion and the camera boresight position. The operations may further include determining, by the controller, a motion of the camera, and correcting, by the controller, the focus of expansion based on the motion of the camera.

A method of controlling a landing light may comprise the steps of receiving, by a controller, a first image at a first time from a camera, receiving, by the controller, a second image at a second time from the camera, estimating, by the controller, a focus of expansion between the first image and the second image, and aiming, by the controller, the landing light based on the focus of expansion.

The method of controlling a landing light may further include identifying, by the controller, a feature in the first image and the second image, and registering, by the controller, a first position of the feature in the first image with a second position of the feature in the second image. The focus of expansion may correspond to a travel direction of the aircraft. The method may further include determining, by the controller, an expansion vector of the feature. The method may further include receiving, by the controller, a camera boresight position. The camera boresight position may correspond to a pointing direction of a nose of the aircraft. The method may further include extracting, by the controller, a bearing angle based on the focus of expansion and the camera boresight position. The bearing angle may correspond to a difference between the pointing direction of the nose of the aircraft and the travel direction of the aircraft. The method may further include determining, by the controller, a motion of the camera, and correcting, by the controller, the focus of expansion based on the motion of the camera. The method may further include receiving, by the controller, a data from the sensor, and verifying, by the controller, the focus of expansion based on the data from the sensor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
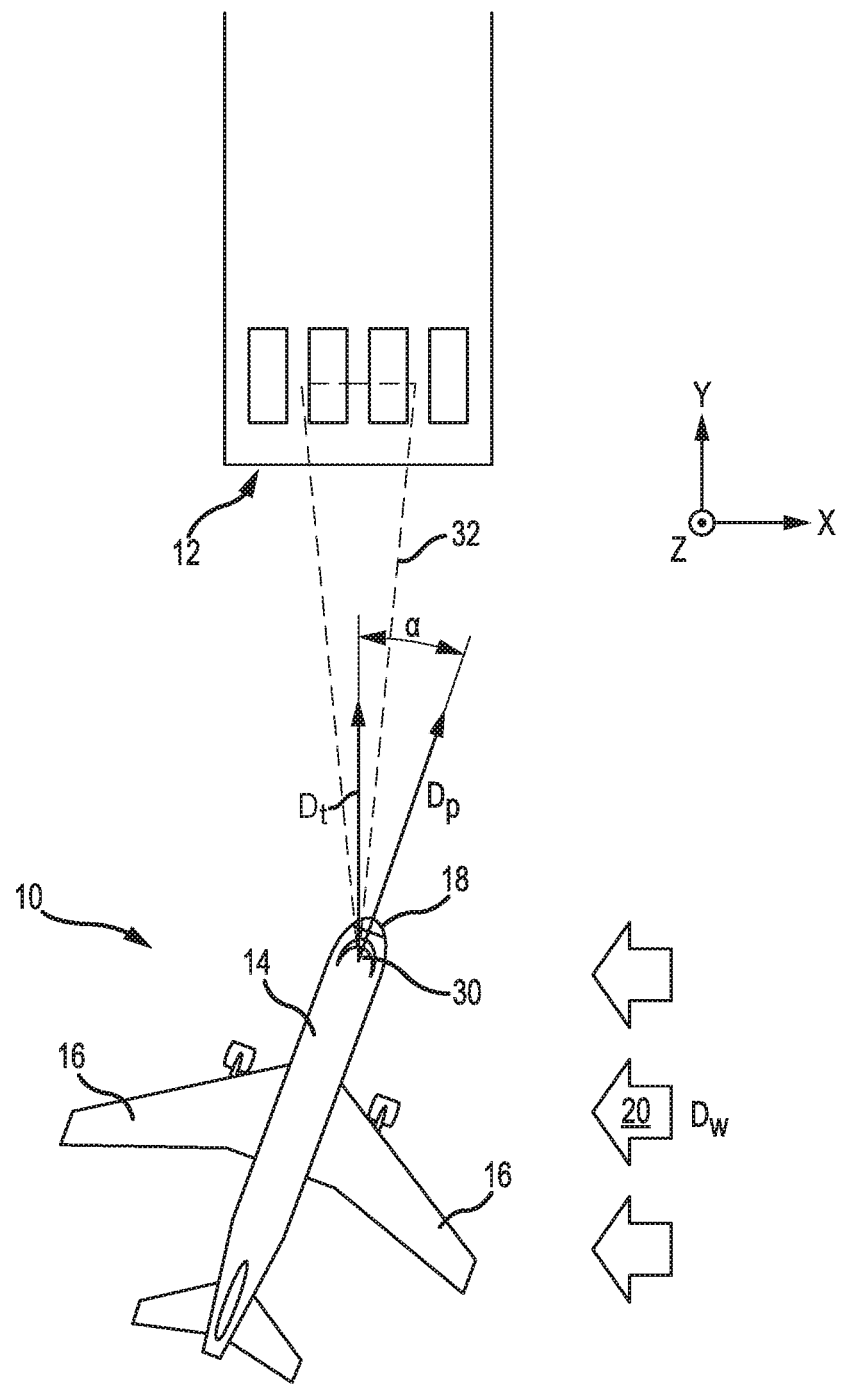
FIG. 1 illustrates an example of an aircraft having a landing light steering system in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Systems and methods are disclosed herein that provide for aiming or steering of an aircraft landing light arrangement. In accordance with various embodiments, by aiming or steering the aircraft landing lights according to the aircraft direction of travel, a pilot may have improved visibility of the landing strip. The systems and methods disclosed herein are suitable for use with various aircraft light systems, although there may be utility for use with other light systems.

In various embodiments and with reference to FIG. 1, an aircraft 10 that includes a light steering system is shown approaching a runway 12. Aircraft 10 may comprise a fuselage 14, which may be coupled to and/or comprise a pair of wings 16. An xyz axis is provided for ease of illustration. Runway 12 is shown, for illustration purposes, oriented in a direction parallel to the y axis. A nose 18 of aircraft 10 may be pointed along an axis of aircraft 10, for example, in a direction forward of fuselage 14. The direction that nose 18 of aircraft 10 is pointing may be referred to as a heading or pointing direction $D_p$. Aircraft 10 may encounter winds that affect the travel path of aircraft 10 such that pointing direction $D_p$ does not reflect the actual direction of travel of aircraft 10. For example, aircraft 10 may experience crosswinds 20 shown, for illustration purposes, with a wind direction $D_w$. Crosswinds 20 may cause aircraft 10 to drift such that the pointing direction $D_p$ of aircraft 10 is different from a travel direction $D_t$ of aircraft 10. A difference between pointing direction $D_p$ and travel direction $D_t$ in the xy plane is illustrated as heading offset $\alpha$. Similarly, aircraft 10 may experience an elevation offset in the yz plane (see FIG. 3D).

In various embodiments, aircraft 10 includes a landing light system 30 having a light steering feature. Landing light system 30 includes one or more landing lights that illuminate an illumination area 32. Landing light system 30 may be configured to aim or steer the landing lights to direct or orient illumination area 32 in the travel direction $D_t$ of aircraft 10. Directing illumination area 32 in the travel direction $D_t$ of aircraft 10 improves visibility of runway 12 and/or the travel path. Illumination area 32 with landing light system 30 can be more narrowly focused, compared to wider dispersion angle illumination, thereby reducing the total illumination power used to illuminate runway 12. Directing illumination area 32 in the travel direction $D_t$ and narrowing the illumination area 32 each reduces illumination in areas outside the travel path. A more focused illumination area 32 reduces pilot distractions caused by illuminating items not in the landing zone.

Figure 2:
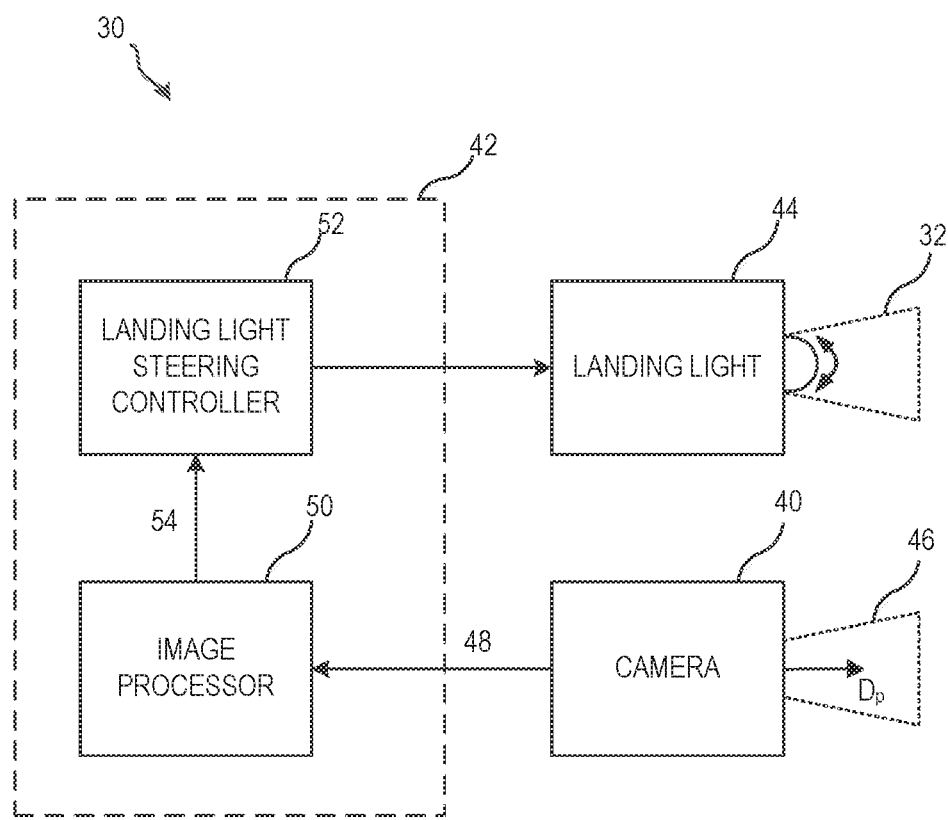
FIG. 2 illustrates a schematic view of a light steering system in accordance with various embodiments.

Referring now to FIGS. 1 and 2, aircraft 10 may include a landing light system 30. In various embodiments, landing light system 30 may comprise a camera 40, a controller 42, and a light or landing light 44. Controller 42 is illustrated in electronic communication (e.g., wired or wirelessly coupled) with camera 40 and landing light 44. Controller 42 may operate to receive information from camera 40 and to produce an output to steer or aim landing light 44 according to a travel direction $D_t$ of aircraft 10. In various embodiments, controller 42 may determine a travel direction $D_t$ of aircraft 10 and may steer or aim landing light 44 in the travel direction $D_t$.

In various embodiments and with reference to FIG. 2, camera 40 may include an optical sensor capable of detecting image data, such as video data. Camera 40 may include a short-wave infrared camera, near infrared camera, greyscale visible camera, red-green-blue (RGB) visible camera, a camera operating in a combination of bands of the light spectrum, or other suitable camera or sensor. Camera 40 may be mounted to an interior or exterior of aircraft 10. Camera 40 may include a field of view 46, which may be oriented in the pointing direction $D_p$ of aircraft 10, and further, may be configured in a fixed or adjustable position. Camera 40 may be adjusted or oriented automatically or by manual operation to direct a field of view 46 of camera 40. Camera 40 may record a series of images 48 within camera field of view 46, which are sent as inputs to controller 42 of landing light system 30. Camera 40 may include a short-wave infrared (SWIR) camera to capture images in a low light environment with sufficient contrast to detect and track landmark features. In various embodiments, camera 40, in combination with controller 42, may be capable of detecting a travel direction $D_t$ of aircraft 10.

Controller 42 may include a computing device (e.g., a processor) and a tangible, non-transitory memory and may be capable of implementing logic. In various embodiments, controller 42 may include an image processor 50 in electrical and/or logical communication with a landing light steering controller 52.

Image processor 50 may include a general purpose processor, a digital signal processor (DSP), an application specific integrated circuit (ASIC), a field programmable gate array (FPGA) or other programmable logic device, discrete gate or transistor logic, discrete hardware components, or any combination thereof. Image processor 50 may be in communication (such as electrical communication) with camera 40 and may be configured to receive input, such as images 48, from camera 40. Image processor 50 may process image data from camera 40 and may provide an output command 54 to landing light steering controller 52.

Controller 42 may comprise one or more landing light steering controllers 52 for directing operation of one or more landing light 44. Controller 42 with a landing light steering controller 52 may operate as a system controller for a landing light system having plurality of landing lights 44. Landing light steering controller 52 may be configured to receive an output command 54 generated by image processor 50 and to execute output command 54. The control functions of landing light steering controller 52 may be embodied as executable logic that is executed by a processor of landing light steering controller 52. Landing light steering controller 52 aims, deflects, or steers landing light 44 to direct illumination area 32 according to a direction of travel of the aircraft. In various embodiments, landing light 44 may be aimed by a mechanical system or a non-mechanical system. Landing light steering controller 52 may comprise a non-mechanical system, such as an electro-optical system, acousto-optic system, thermal optical system, or other non-mechanical system. Landing light steering controller 52 may further comprise a mechanical system and may include a physical driver or actuator, such as an electromechanical actuator, piezoelectric actuator, electromagnetic actuator, or other actuator for steering a landing light 44. In various embodiments, landing light 44 may be coupled to a gimbal or other steerable mounting assembly to allow landing light 44 to be steered with respect to multiple axes of rotation.

Referring momentarily to FIGS. 1 and 2, landing light 44 may be coupled to aircraft 10 and may be mounted externally on aircraft 10, for example, landing light 44 may be coupled to nose 18, wings 16, fuselage 12 or another part of aircraft 10. Landing light 44 may include one or more movable or adjustable lights. In various embodiments, landing light 44 may be coupled to a gimbal and an actuator for steering landing light 44. Landing light 44 may include one or more light-emitting diodes (LEDs), phosphorescent lights, incandescent lights, florescent lights, light strips, or any other suitable light source. For example, landing light 44 may include a plurality or an array of lights. Landing light steering controller 52 may include a switch for selectively illuminating a subset of an array of lights to effectively steer the illumination area of landing light 44. In various embodiments, illuminating a subset of a light array directs or changes the illumination area of landing light 44, thereby effectively steering landing light 44.

Figure 3A:
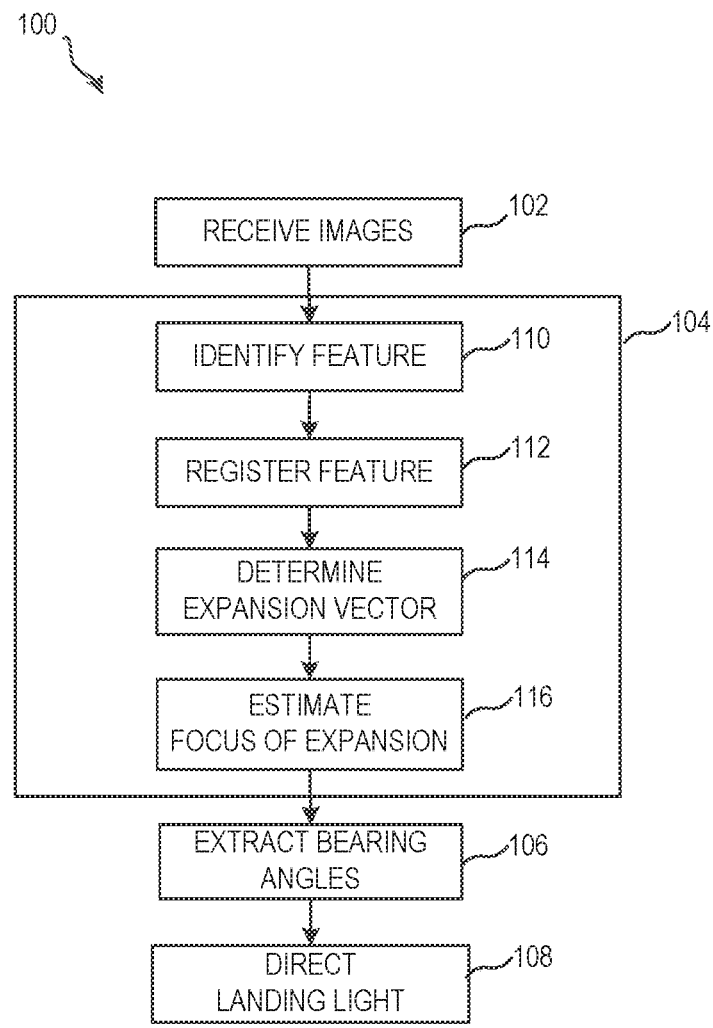
FIG. 3A illustrates a process of controlling a landing light system in accordance with various embodiments.

With reference to FIG. 3A, a method 100 for controlling a landing light 44 (of FIG. 2) is provided, in accordance with various embodiments. Controller 42 may be capable of carrying out the steps of FIG. 3A. Method 100 performed by controller 42 may include receiving a plurality of images from a camera (step 102). Method 100 may include estimating or determining a focus of expansion of the optical flow of the images (step 104). Method 100 may include extracting bearing angles based on the focus of expansion and the pointing direction of the camera (step 106). Method 100 may include aiming or directing an orientation of a landing light based on the bearing angles and estimated focus of expansion (step 108).

Step 104 of method 100 may comprise sub-steps including identifying one or more features in the images (step 110). Step 104 of method 100 may further include registering the features from the images (step 112). Step 104 of method 100 may further include determining a direction of expansion or the expansion vectors for the registered features (step 114). Step 104 of method 100 may further include estimating a focus of expansion based on the expansion vectors (step 116).

With further reference to FIG. 3A, step 102 may further include receiving a first image from a first time and receiving a second image from a second time. The second time may be later than the first time. Images may be captured while pulsing the landing light off to avoid backscatter and glare from close-up objects, such as rain or snow. The landing light may be pulsed off for short intervals at a high frequency such that the pulsing is unnoticed by a human eye. Camera 40 may capture images 48 during an off period of landing light 44 when pulsed in order to improve the image exposure. Landing light 44 may be pulsed on for intervals of short duration such that illumination by landing light 44 appears continuous to the pilot.

Step 110 may further include identifying or extracting one or more landmarks as features in the field of view of the camera in each of the first image and the second image. Features may include stationary objects on the ground such as runway features, buildings, landscape features, or other objects. Features may include lights, such as runway lights, in a light spectrum visible to the camera. In various embodiments, camera 40 (of FIG. 2) may be configured to sense a light spectrum emitted by runway lights, which may include the visible spectrum, SWIR spectrum, or a combination of light spectrums.

Step 112 may further include comparing the second image to the first image to register the identified features from the second image with the first image, using for example, a frame-to-frame feature registration algorithm such as shift invariant feature extractor (SIFT), speeded-up robust features (SURF), features from accelerated segment test (FAST), or other suitable registration method. Step 112 may include registering a first position of the feature in the first image to a second position of the same feature in the second image by identifying scale invariant features and registering the features, which are scale invariant.

Figure 3B:
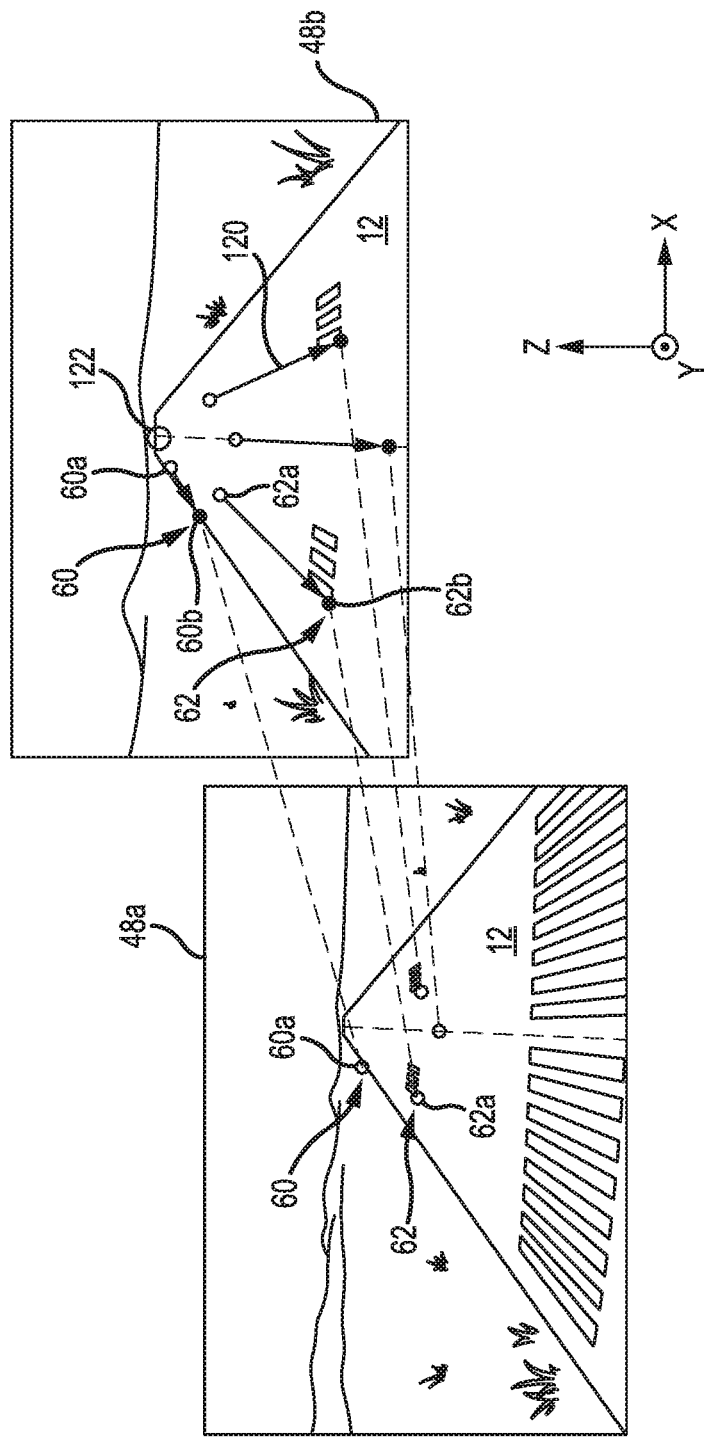
FIG. 3B illustrates an image processing step for controlling a landing light system including determining optical flow of an image in accordance with various embodiments.

With reference to FIG. 3B, additional detail of method 100 (of FIG. 3A) for controlling a landing light 44 (of FIG. 2) including image processing is shown, in accordance with various embodiments. With reference to FIGS. 3A and 3B, registering the features from the images (step 112) may further include determining a first position 60a of a first feature 60 in a first image 48a and determining a second position 60b of the first feature 60 in a second image 48a. Step 112 may further include determining a first position 62a of a second feature 62 in the first image 48a and determining a second position 62b of the second feature 62 in the second image 48a. First image 48a may be captured at a first time. Second image 48b may be captured at a second time, which is later than the first time. Step 112 may include registering any number of identified features in the camera field of view. Any number of features may be identified and registered between an earlier image and a later image.

Determining a direction of expansion of features 60, 62 (step 114) may further include constructing an optical flow based on the positions of features 60, 62 in the first image 48a and the second image 48b and based on an image capture interval. In various embodiments, an image capture interval comprises a duration of time between image captures by the camera. For example, the image capture interval may be based on the camera parameters and may further be based on the aircraft velocity. In this manner, more frequent samples may be taken when the aircraft is traveling at higher velocities and less frequent samples may be taken when the aircraft is traveling at lower velocities. A direction of expansion or expansion vector is calculated with respect to the first position and second position of features 60, 62. Expansion vector 120 for features 60, 62 is calculated with respect to the coordinates of images 48a, 48b. A plurality of expansion vectors 120 may be used to construct the optical flow of images 48a, 48b. Step 114 may include determining expansion vectors 120 for any number of registered features, for example, from step 112.

Estimating a focus of expansion (step 116) may further include processing the optical flow of images 48a, 48b using expansion vectors 120. Expansion vectors in an image may originate from approximately or converge upon a single point in the image, the point of origination or convergence may be referred to as the focus of expansion. A focus of expansion 122 in image 48b may be estimated based on expansion vectors 120 calculated for a plurality of features, such as features 60, 62. Focus of expansion 122 may be estimated using any number of expansion vectors 120, for example, from step 114. Focus of expansion 122 may correspond to a travel direction of the aircraft.

Figure 3C:
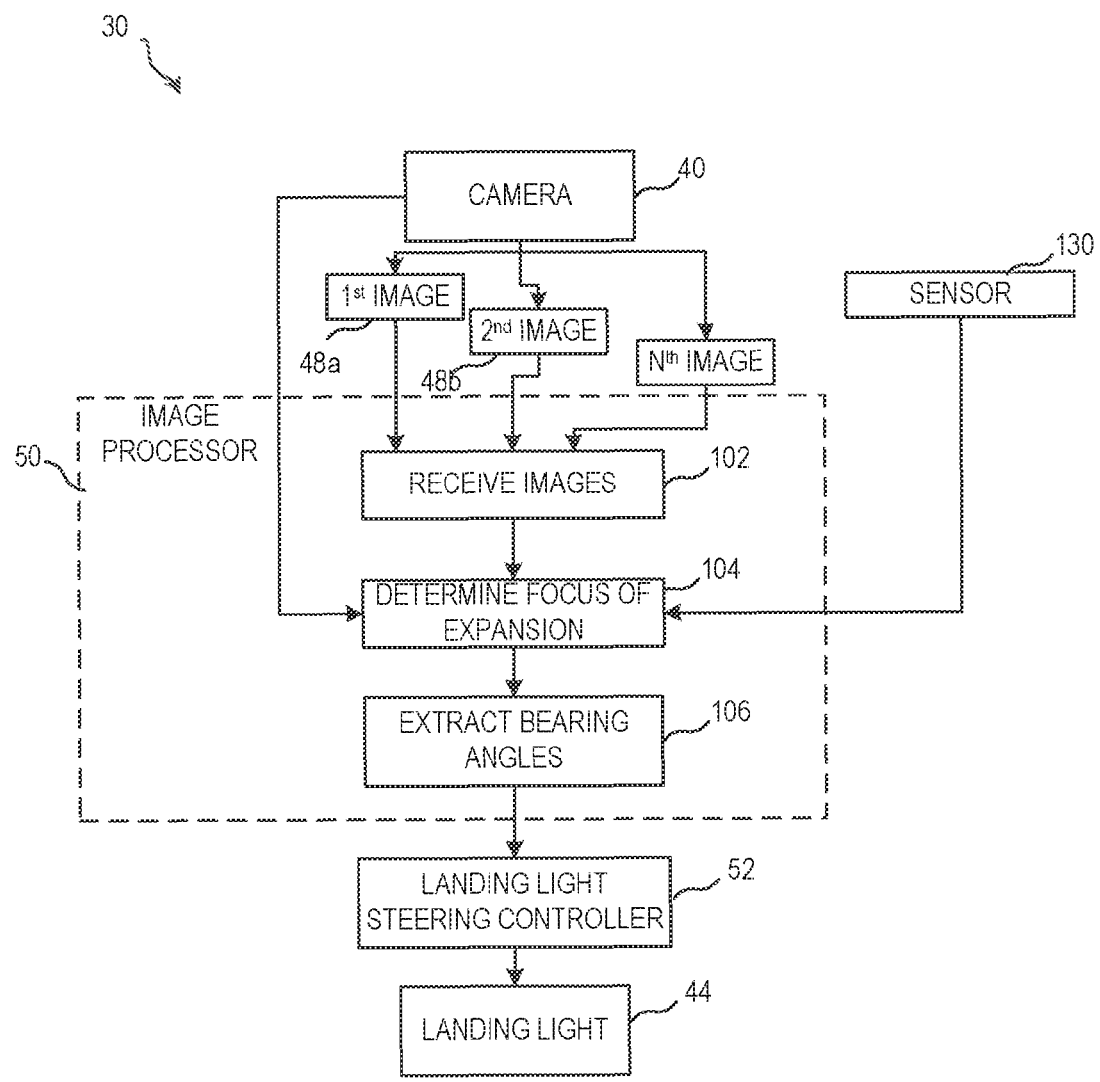
FIG. 3C illustrates a block diagram of a landing light system for controlling a landing light according to a travel direction of the aircraft, in accordance with various embodiments.

With reference to FIG. 3C, a flow chart illustrating a landing light system 30 and a method of controlling landing light 44 is shown, in accordance with various embodiments. By performing video analytics of the scene from camera 40, image processor 50 of controller 42 may determine the aircraft direction of travel and extract bearing angles, such as azimuth and elevation, in order to point the landing light 44 in the direction of travel $D_t$. The bearing angles are communicated as steering commands and are communicated to landing light steering controller 52, which directs landing light 44 to point the illumination area in the aircraft travel direction.

In various embodiments, movement of camera 40 may be accounted for in the step of determining the focus of expansion (step 104). A sensor 130 may provide data or information about the aircraft or the camera. Data from one or more sensors 130 may be used to determine motion of camera 40, such as egomotion. In various embodiments, sensor 130 may be mounted to camera 40 and may include, for example, a gyro or rotary encoder configured to detect an angular position of the camera 40. Referring momentarily to FIG. 1, aircraft 10 may include an avionics unit having a plurality of sensors 130 for measuring or determining avionics data such as altitude, vertical speed, airspeed, acceleration, orientation, pitch rate, roll rate, or other parameter or characteristic of the aircraft. The avionics unit may include a variety of sensor types, such as a global positioning system (GPS) and/or another device such as a gyroscope. In various embodiments, a sensor 130 may comprise an aircraft ground speed velocity identification sensor and/or an airspeed sensor. Moreover, a sensor 130 may comprise an accelerometer, or gyroscopic sensor, radar sensor or any other sensor. In various embodiments, an aircraft may also comprise a variety of sensors 130 that measure aircraft acceleration and deceleration. Data from sensor 130 may be included in the calculations and algorithms used for determining and verifying the focus of expansion and correcting for motion of camera 40. In various embodiments, the step of determining the focus of expansion (step 104) may include correcting for first order stimuli and/or second order stimuli, such as rotational motion, translational motion, or other motion of camera 40. For example, rotational error in camera 40 may be calculated using data from sensor 130, and step 104 may include correcting for a first order effect or rotational component of the egomotion of camera 40. Translational error may also be calculated using data from sensor 130, and step 104 may include correcting for a second order effect or translational component of the egomotion of camera 40.

In various embodiments, additional data from camera 40 may be used to check or verify the optical flow calculations during the step of determining the focus of expansion (step 104). Camera 40 may detect a location of runway, for example, by determining a position of runway lights. A location of runway may be used as an input to the optical flow calculations to estimate the focus of expansion of image 48. Image processor 50 may receive information about a position of camera 40, such as the boresight position. A position of the camera boresight may be compared to the focus of expansion to determine bearing angles, such as elevation offset and heading offset between the camera boresight and the camera image focus of expansion.

Figure 3D:
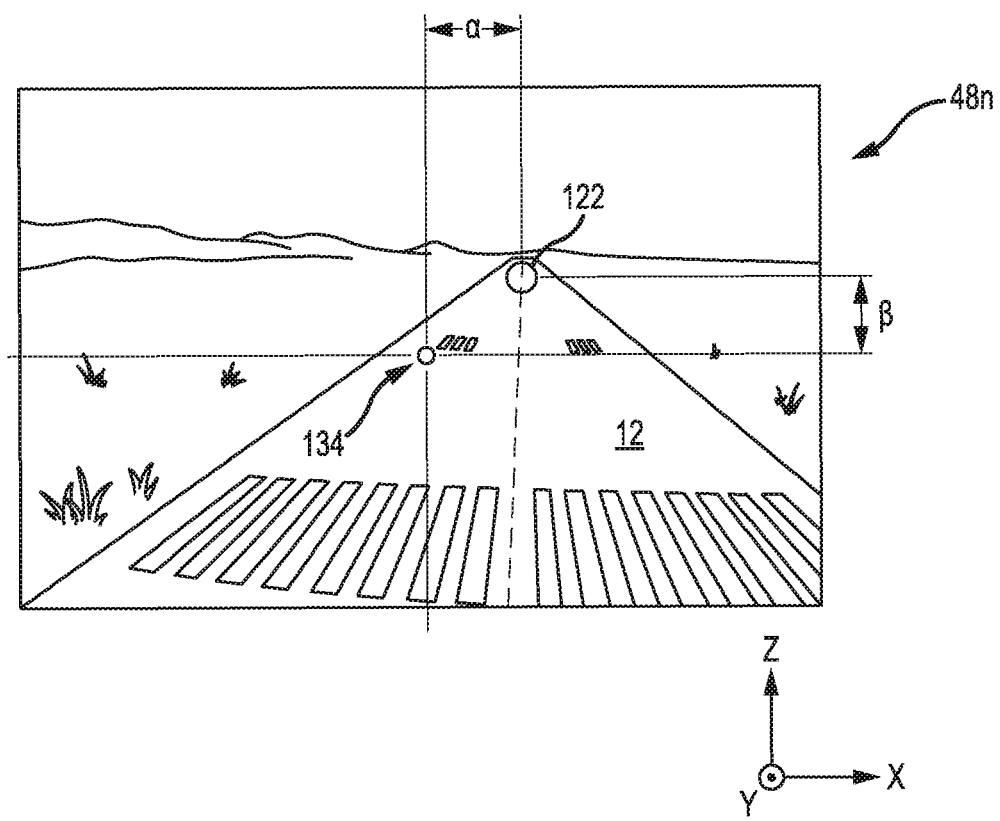
FIG. 3D illustrates an image processing step for controlling a landing light system including extracting bearing angles for the travel direction of the aircraft, in accordance with various embodiments.

With reference to FIGS. 3C and 3D, additional detail of a method for controlling a landing light 44 including image processing is shown, in accordance with various embodiments. Focus of expansion 122 for an image 48n may be determined according to the methods described herein, such as method 100 (of FIG. 3A). In various embodiments, focus of expansion 122 may be compared to a pointing direction of camera 40, such as boresight position 134. Boresight position 134 may correspond or correlate to a pointing direction of the nose of the aircraft. A difference in position or bearing between focus of expansion 122 and boresight position 134 may correlate to a difference between the pointing direction and travel direction of the aircraft. A difference between the pointing direction and travel direction of the aircraft in the xy plane is illustrated as heading offset α. A difference between pointing direction and travel direction of the aircraft in the yz plane is illustrated as elevation offset β. Heading offset α and elevation offset β may be the bearing angles or may be used to extract bearing angles (see step 106) as an output of image processor 50. The bearing angles, such as heading offset α and elevation offset β, may correspond to a difference between the pointing direction of a nose of the aircraft and the travel direction of the aircraft. Bearing angles may be sent as an output command to landing light steering controller 52, which directs landing light 44 to illuminate in the direction of aircraft travel. Landing light steering controller 52 may direct landing light 44 to point or aim an illumination area in a direction of focus of expansion 122 in order to illuminate the flight path. Thus, landing light system 30 provides an automated system for steering or aiming landing light 44 based on the direction of travel of an aircraft.

The present disclosure describes landing lights having a light steering system. Such light steering systems may be used in aircraft systems, such as, for example, aircraft landing systems. However, the systems and methods of the present disclosure may be suitable for use in non-aircraft systems as well. In various embodiments, the light steering systems described herein may be used with any suitable aircraft and/or vehicle with lights (e.g., a commercial aircraft, a military aircraft, a helicopter, an un-manned aircraft, and/or the like).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing light system, comprising:
   a camera;
   a controller;
   a landing light; and
   a tangible, non-transitory memory configured to communicate with the controller, the tangible, non-transitory memory having instructions stored thereon that, in response to execution by the controller, cause the controller to perform operations comprising:
   receiving, by the controller, a first image at a first time from the camera,
   receiving, by the controller, a second image at a second time from the camera,
   estimating, by the controller, a focus of expansion between the first image and the second image, and
   aiming, by the controller, the landing light based on the focus of expansion.

2. The landing light system of claim 1, wherein the operations further comprise:
   identifying, by the controller, a feature in the first image and the second image; and
   registering, by the controller, a first position of the feature in the first image with a second position of the feature in the second image.

3. The landing light system of claim 2, wherein the operations further comprise determining, by the controller, an expansion vector of the feature.

4. The landing light system of claim 1, wherein the operations further comprise receiving, by the controller, a camera boresight position.

5. The landing light system of claim 4, wherein the operations further comprise extracting, by the controller, a bearing angle based on the focus of expansion and the camera boresight position.

6. The landing light system of claim 5, wherein the operations further comprise:
   determining, by the controller, a motion of the camera; and
   correcting, by the controller, the focus of expansion based on the motion of the camera.

7. The landing light system of claim 1, further comprising a sensor, wherein the operations further comprise:
   receiving, by the controller, a data from the sensor; and
   verifying, by the controller, the focus of expansion based on the data from the sensor.

8. An article of manufacture including a non-transitory, tangible computer readable storage medium having instructions stored thereon that, in response to execution by a controller, cause the controller to perform operations comprising:
   receiving, by the controller, a first image at a first time from a camera;
   receiving, by the controller, a second image at a second time from the camera;
   estimating, by the controller, a focus of expansion between the first image and the second image; and
   aiming, by the controller, a landing light based on the focus of expansion.

9. The article of manufacture of claim 8, wherein the operations further comprise:
    identifying, by the controller, a feature in the first image and the second image; and
    registering, by the controller, a first position of the feature in the first image with a second position of the feature in the second image.

10. The article of manufacture of claim 9, wherein the operations further comprise determining, by the controller, an expansion vector of the feature.

11. The article of manufacture of claim 8, wherein the operations further comprise receiving, by the controller, a camera boresight position.

12. The article of manufacture of claim 11, wherein the operations further comprise extracting, by the controller, a bearing angle based on the focus of expansion and the camera boresight position.

13. The article of manufacture of claim 12, wherein the operations further comprise:
    determining, by the controller, a motion of the camera; and
    correcting, by the controller, the focus of expansion based on the motion of the camera.

14. A method of controlling a landing light of an aircraft, comprising:
    receiving, by a controller, a first image at a first time from a camera;
    receiving, by the controller, a second image at a second time from the camera;
    estimating, by the controller, a focus of expansion between the first image and the second image; and
    aiming, by the controller, the landing light based on the focus of expansion.

15. The method of claim 14, further comprising:
    identifying, by the controller, a feature in the first image and the second image; and
    registering, by the controller, a first position of the feature in the first image with a second position of the feature in the second image.

16. The method of claim 15, wherein the focus of expansion corresponds to a travel direction of the aircraft.

17. The method of claim 16, further comprising receiving, by the controller, a camera boresight position, wherein the camera boresight position corresponds to a pointing direction of a nose of the aircraft.

18. The method of claim 17, further comprising extracting, by the controller, a bearing angle based on the focus of expansion and the camera boresight position, wherein the bearing angle corresponds to a difference between the pointing direction of the nose of the aircraft and the travel direction of the aircraft.

19. The method of claim 14, further comprising:
    determining, by the controller, a motion of the camera; and
    correcting, by the controller, the focus of expansion based on the motion of the camera.

20. The method of claim 14, further comprising:
    receiving, by the controller, a data from a sensor; and
    verifying, by the controller, the focus of expansion based on the data from the sensor.

* * * * *